W. J. STURGESS.
FRICTIONAL BEARING FOR LOOKING GLASSES, &c.
APPLICATION FILED FEB. 1, 1908.

905,760.

Patented Dec. 1, 1908.
2 SHEETS—SHEET 1.

Witnesses.
J Bernard Hayward.
h. Goodwin

Inventor
William Jethro Sturgess
by Charles J Powell
Attorney

THE NORRIS PETERS CO., WASHINGTON, D. C.

W. J. STURGESS.
FRICTIONAL BEARING FOR LOOKING GLASSES, &c.
APPLICATION FILED FEB. 1, 1908.
905,760.
Patented Dec. 1, 1908.
2 SHEETS—SHEET 2.
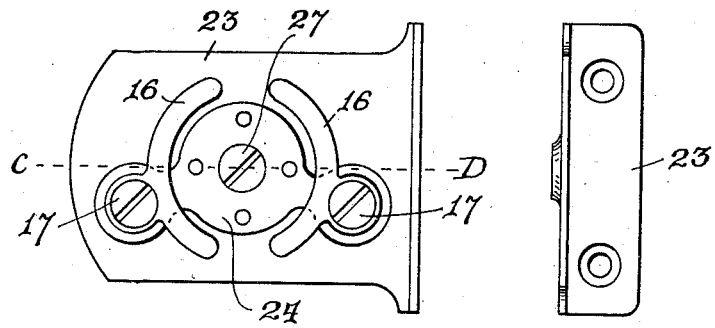
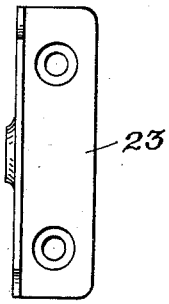
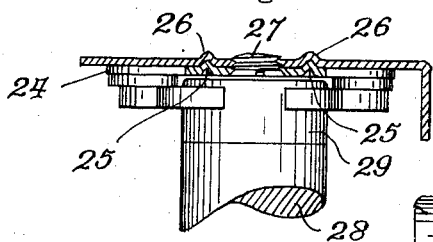
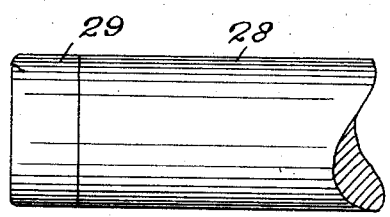
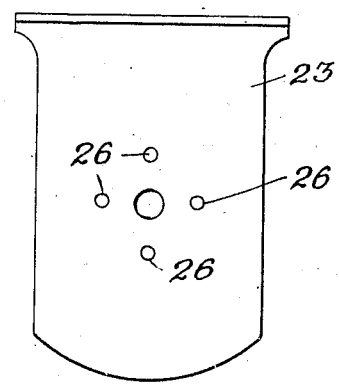
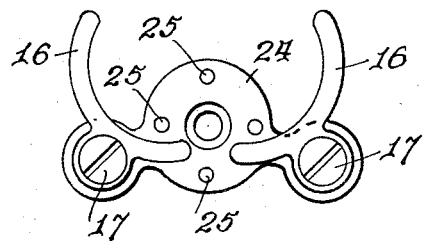

UNITED STATES PATENT OFFICE.

WILLIAM JETHRO STURGESS, OF BIRMINGHAM, ENGLAND.

FRICTIONAL BEARING FOR LOOKING-GLASSES, &c.

No. 905,760.  Specification of Letters Patent.  Patented Dec. 1, 1908.

Application filed February 1, 1908.  Serial No. 413,874.

*To all whom it may concern:*

Be it known that I, WILLIAM JETHRO STURGESS, subject of the King of Great Britain, residing at 29 Cromer road, Balsall Heath, Birmingham, England, have invented certain new and useful Improvements in Frictional Bearings for Looking - Glasses, Movable Blind-Rollers, and other Similar Purposes, of which the following is a specification.

This invention relates to improvements in frictional bearings for looking glasses, movable blind rollers, and other similar purposes, and is constructed as follows:—Attached to a mirror standard, or window frame, is a metal plate (or wooden block) to which are pivoted by rivets, pins, or screws, a pair of wings; each wing is provided with a (preferably) part circular face, the said faces being arranged to oppose each other to form a housing or bearing to receive a drum shaped piece, which is screwed or otherwise fastened to the mirror frame or roller ends. One of these devices may be arranged at each side of the mirror, or at each end of the blind roller. The pivoted wings serve to clamp the drum shaped piece in position after movement of the mirror or roller.

In order to more clearly explain my said invention I have appended hereunto illustrative sheets of drawings, upon which are figures and numbers of reference, similar numbers referring throughout the several views to the same thing or part, and in which:—

Figure 1:
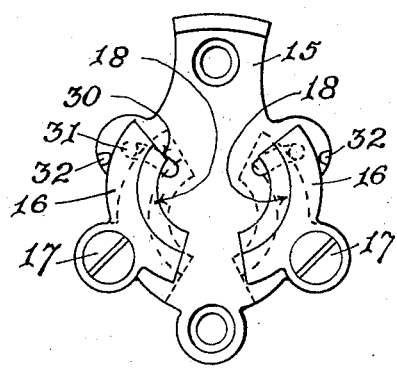
Figure 2:
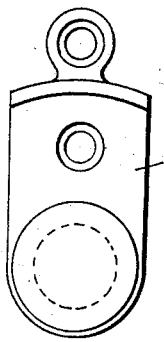
Figure 3:
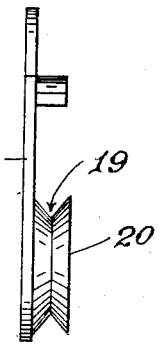
Figure 4:
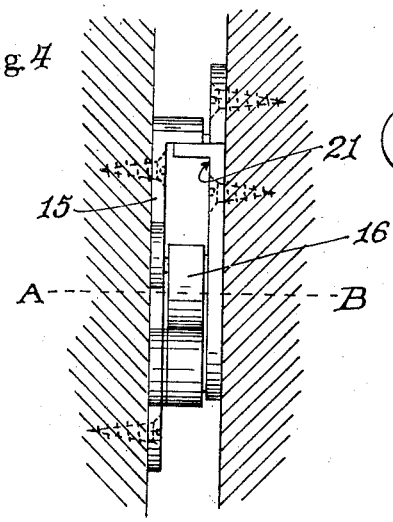
Figures 6, 7:
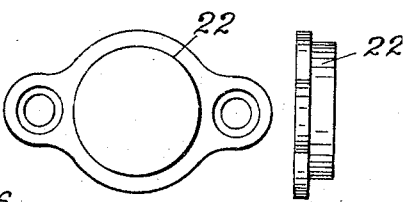
Figure 5:
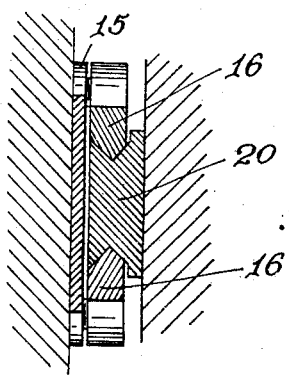

Figure 1 is a front view of this invention as arranged say for instance for a looking glass movement, in which the wings are shown having V shaped clamping surfaces. Fig. 2 is a front view, and Fig. 3 a side view of the drum portion of the fitting to accommodate the aforesaid wings. Fig. 4 is a side view showing the two parts placed together in their working position. Fig. 5 shows a sectional view of the same on line A—B. Fig. 6 is a front view, and Fig. 7 a side view of the drum fitting slightly modified in shape to that before mentioned. Fig. 8 is a front view, and Fig. 9 a part sectional plan view on line C—D of the invention as arranged say for instance for a blind roller. Fig. 10 is an end view of the plate alone, with the wings &c. removed. Fig. 11 is a front view of the plate showing more particularly the holes or recesses by which the annular position of the fitting may be adjusted. Fig. 12 shows a detail view of the wings, and the adjusting plate to which they are attached, as seen when separated from the base plate. Fig. 13 shows the end of a roller suitable for this device.

Referring now to Figs. 1 to 5, 15 is a plate, preferably of metal, which is secured by means of screws or the like to a mirror standard, or other fixture. 16, 16, are wings pivoted at 17, 17, to the said plate. It will be seen that these wings are made segmentally or part circular, and in this case their inner surfaces 18 are made of a V shape to correspond with the V shaped groove 19 in the journal block 20. This journal block is formed upon or secured to plate 21, which said plate is secured to the moving looking glass or other movable body. If desired this V shaped groove may be dispensed with, and the surface left plain, as seen at 22, see Figs. 6 and 7. It will also be further noticed that the shape of the plate 21 may be modified to suit various requirements. In assembling these parts together it is only necessary to open the wings 16 at their upper parts so that the journal 20 can be lowered thereinto, when it will be readily understood that as the journal is lowered the said wings close thereon until they assume the position shown in dotted lines, thus embracing the said journal, when it will be further seen that the weight of the said journal (together with the body to which it is attached) only tends to tighten or increase the clamping action of the two wings, and thus giving the required friction for this class of mechanism.

The plate 15 is provided at its upper end with a transverse curved projecting flange 30 and the plate 21 is provided at its upper end with a similar flange 31 which is somewhat longer than the flange 30 and which engages under the same in the assembled relation of the parts. The flange 30 thereby constitutes a stop to hold the mirror frame from accidental upward displacement. In the form of the invention illustrated, such frame can be removed from its support only after it has been tilted on its pivot sufficiently, in either direction, for the flange 31 to pass by the flange 30.

Referring now to Figs. 8 to 13, it will be seen that I may somewhat modify the construction of this my invention, as follows:—

23 is the plate upon which the wings device is carried. Instead however of mounting the wings direct to the plate 23 I find it an advantage to have an intercepting plate 24, and to this intercepting plate, the wings 16 are pivoted at 17. Upon this plate 24 I further form projections 25, which are more readily seen in Fig. 9, which may be done by indenting the metal plate at such points: and corresponding therewith I further form similar indentations at 26 in the plate 23 wherein the projecting parts 25 may rest. This plate 24 is now secured to the plate 23 by means of a screw pin 27. The purpose of these projections and the intercepting plate is as follows:—As seen in Figs. 8 and 9 the bracket 23 assumes a horizontal direction suitable for instance to carry a blind roller such as 28, in which the metal end 29 is made to rest in and be embraced by the wings 16, but should it be desired that the bracket 23 should assume the vertical position, it will only be necessary to slacken the screw 27, and move the plate 24 around one fourth of a turn, when the projections will again fall into the recesses 26, and the screw 27 made fast. By these means it will be seen that the clamping action of the wings is automatic, any increased weight or downward pull serving only to increase the friction, by reason of the weight resting upon the lower parts of the wings which lie below the center of the pivots 17; while on the other hand an upward lift of the roller or other moving part readily opens the wings, so that the roller or its like may be removed. If desired I may further provide stops or the like to limit the opening movement of the said wings, such for instance as seen in Fig. 1, in which curved slot holes 30 are made in the plate 15, in which a peg 31 protruding from the side of the wing may enter; or if otherwise desired, an upstanding peg 32 may be formed upon the plate, against which the back of the wing may rest.

Although I have described this my invention as applicable to window blind rollers and looking glass movements, it will be readily seen that it may be easily adapted for other swinging bodies, such as sashes, fan-lights, ventilators, easel frames, reading desks, or other hinged bodies where a frictional contact is required, or where a quick disconnecting hinged joint is required.

What I claim as my invention and desire to secure by Letters Patent is:—

1. In bearings of the type set forth combined with a stationary support and a pivoted part, a projecting journal carried by said pivoted part and means carried by the support to receive the journal, said means being constructed for movement to allow of introducing the journal thereinto or removing the same therefrom, and to frictionally clamp upon the journal under the weight of the pivoted part.

2. In bearings of the type set forth, combined with a stationary support and a pivoted part, a projecting journal carried by said pivoted part, and oppositely located and curved wings carried pivotally by the support, said wings being movable away from one another to permit of said journal being introduced therebetween or removed therefrom, said wings acting to clamp frictionally upon the journal under the weight of the supported pivoted part.

3. In bearings of the type set forth, combined with a stationary supporting part and a pivoted part, a journal carried by one of said parts and a bearing carried by the other part and comprising pivotally mounted wings acting to support and to clamp frictionally upon the journal, said wings having movement under the pressure of the journal to permit of the passage of the latter thereby, when the pivoted part is moved from the supporting part.

4. In bearings of the type set forth, combined with a stationary support and a pivoted part, a plate carried by the support, oppositely curved and located wings pivoted upon the plate, said wings having their inner edge portions of tapering cross section, a plate carried by the pivoted part and a journal carried by the last named plate and having a grooved peripheral surface, said journal fitting between the wings and receiving the edge portions thereof in the grooved surface.

5. In bearings of the type set forth, combined with a stationary support and a pivoted part, a plate secured to the support, a second plate secured to the first plate, a pivotal adjusting means for the second plate, a journal secured to the pivoted part and bearing means secured to the second plate and constructed to support the journal in detachable relation.

6. In bearings of the type set forth, combined with a stationary support and a pivoted part, a plate secured to the support, a second plate secured to the first plate, a pivotal adjusting means for the second plate, oppositely located and curved wings pivoted on the second plate, and a journal projecting from said pivoted part and constructed to be supported detachably between said wings, said wings acting to bind frictionally on the journal under the weight of the pivoted part.

7. In bearings of the type set forth, combined with a stationary supporting part and a pivoted part, a journal carried by one of said parts and a bearing carried by the other part and comprising relatively movable members having clamping action upon the journal and having movement to permit of the removal of the journal therefrom, and means for preventing removal of the pivoted part from the supporting part except at certain stages of the pivotal movement of the pivoted part.

8. In bearings of the type set forth, combined with a stationary supporting part and a pivoted part, a journal carried by one of said parts and a bearing carried by the other part and comprising relatively movable members having clamping action upon the journal, and having movement to permit of the removal of the journal therefrom, a curved flange provided on the stationary part and a second curved flange provided on the pivoted part and constructed to engage under the first named flange as and for the purpose set forth.

In testimony whereof I have hereunto set my hand in presence of two subscribing witnesses.

WILLIAM JETHRO STURGESS.

Witnesses:
J. BERNARD HAYWARD,
N. GOODWIN.